US011736225B2

United States Patent
Kamaganahalli Mudlappa et al.

(10) Patent No.: US 11,736,225 B2
(45) Date of Patent: Aug. 22, 2023

(54) PACKET SCHEDULER

(71) Applicant: Nokia Solutions and Networks Oy, Espoo (FI)

(72) Inventors: Prasanna Kamaganahalli Mudlappa, Bangalore (IN); Joseph Thaliath, Bangalore (IN); Vaibhav Singh, New Delhi (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 17 days.

(21) Appl. No.: 17/082,713

(22) Filed: Oct. 28, 2020

(65) Prior Publication Data
US 2021/0143933 A1 May 13, 2021

(30) Foreign Application Priority Data
Nov. 13, 2019 (FI) .................................... 20195967

(51) Int. Cl.
H04L 1/00 (2006.01)
G06N 20/00 (2019.01)
H04B 7/0413 (2017.01)
H04W 72/52 (2023.01)

(52) U.S. Cl.
CPC ........... H04L 1/0026 (2013.01); G06N 20/00 (2019.01); H04B 7/0413 (2013.01); H04L 1/0003 (2013.01); H04W 72/52 (2023.01)

(58) Field of Classification Search
CPC ............ H04L 1/0026; H04L 1/0003; H04W 72/1252; H04W 28/0289; H04W 28/0284; H04B 7/0452; G06N 20/00
USPC ................................ 370/329, 335, 242, 445
See application file for complete search history.

(56) References Cited

U.S. PATENT DOCUMENTS

| 8,103,218 B2 | 1/2012 | Wu et al. | |
|---|---|---|---|
| 2006/0256805 A1* | 11/2006 | Cho | H04B 7/0452 370/445 |
| 2009/0190561 A1* | 7/2009 | Yokoyama | H04L 1/002 370/335 |
| 2009/0262850 A1 | 10/2009 | Catreux et al. | |

(Continued)

FOREIGN PATENT DOCUMENTS

| CN | 202617117 U | 12/2012 | |
|---|---|---|---|
| EP | 2 112 771 A1 * | 4/2008 | H04B 7/04 |

(Continued)

OTHER PUBLICATIONS

Extended European Search Report received for corresponding European Patent Application No. 20204063.0, dated Mar. 22, 2021, 8 pages.

Abdulhasan et al., "A Channel Quality Indicator (CQI) Prediction Scheme using Feed Forward Neural Network (FF-NN) Technique for MU-MIMO LTE System", IEEE 2nd International Symposium on Telecommunication Technologies (ISTT), Nov. 24-26, 2014, pp. 17-22.

(Continued)

*Primary Examiner* — Kwang B Yao
*Assistant Examiner* — Syed M Bokhari
(74) *Attorney, Agent, or Firm* — Kramer & Amado, P.C.

(57) ABSTRACT

An apparatus, method and computer program is described comprising: executing, in a first mode of operation, a MIMO for one or more user devices eligible to transmit data in a slot of a packet scheduler, to generate MIMO operation outputs; obtaining, in a second mode of operation, estimated MIMO operation outputs for said one or more user devices from a lookup table; and determining whether to operate in the first mode of operation or the second mode operation.

15 Claims, 9 Drawing Sheets

(56) References Cited

U.S. PATENT DOCUMENTS

| | | | |
|---|---|---|---|
| 2010/0296591 A1 | 11/2010 | Xu et al. | |
| 2013/0033989 A1* | 2/2013 | Barbieri | H04L 1/0015 370/242 |
| 2018/0367192 A1 | 12/2018 | O'Shea et al. | |
| 2020/0145154 A1* | 5/2020 | Black | H04L 5/0035 |

FOREIGN PATENT DOCUMENTS

| | | | |
|---|---|---|---|
| EP | 2112771 A1 | 10/2009 | |
| EP | 2 422 542 B1 * | 4/2010 | H04B 7/04 |
| EP | 2422542 B1 | 9/2017 | |
| JP | 2012-524481 A | 10/2012 | |
| KR | 20080039768 A | 5/2008 | |
| WO | 2010/121385 A1 | 10/2010 | |

OTHER PUBLICATIONS

Ain et al., "An Evaluation of Scheduling Algorithms in LTE based 4G Networks", International Conference on Emerging Technologies (ICET), Dec. 19-20, 2015, 6 pages.

Zhu et al., "Efficient CQI Update Scheme for Codebook Based MU-MIMO with Single CQI Feedback in E-UTRA", IEEE 19th International Symposium on Personal, Indoor and Mobile Radio Communications, Sep. 15-18, 2008, 6 pages.

Yazdanbakhsh et al., "Forecasting of Multivariate Time Series via Complex Fuzzy Logic", IEEE Transactions on Systems, Man, and Cybernetics: Systems, vol. 47, No. 8, Aug. 2017, pp. 2160-2171.

Office action received for corresponding Finnish U.S. Appl. No. 20/195,967, dated Mar. 13, 2020, 10 pages.

Notice of Allowance received for corresponding Japanese Patent Application No. 2020-188616, dated Dec. 6, 2021, 1 page of Notice of Allowance and no page of translation available.

* cited by examiner

PACKET SCHEDULER

FIELD

The present specification relates to packet scheduling.

BACKGROUND

Packet scheduling in mobile communication systems can be a time critical process. It can be difficult to perform the processing required within a desired time period. Although developments have been made in this area, there remains a need for further developments in this field.

SUMMARY

In a first aspect, this specification describes an apparatus (e.g. a packet scheduler module) comprising means for performing: executing, in a first mode of operation, a Multiple Input Multiple Output (MIMO) operation for one or more user devices eligible to transmit data in a slot of a packet scheduler, to generate Multiple Input Multiple Output operation outputs; obtaining, in a second mode of operation, estimated Multiple Input Multiple Output operation outputs for said one or more user devices from a lookup table (e.g. a ML predicted lookup table); and determining whether to operate in the first mode of operation or the second mode operation. The apparatus may be provided at a communication node, such as a base station, gNB etc. The MIMO operation may, for example, be a multi-user MIMO operation or a Massive MIMO operation.

In some example embodiments, the means are further configured to perform: determining whether a load level of a communication node is above or below a threshold, wherein the apparatus is determined to operate in the first mode when the load level is below said threshold and the apparatus is determined to operate in the second mode when the load level is above said threshold. The apparatus may further comprise obtaining (e.g. determining, receiving or otherwise obtaining) the load level of the communication node.

The Multiple Input Multiple Output (MIMO) operation may be executed, in the first mode of operation, using channel metric data as inputs to said operation. The channel metric data may, for example, comprise channel quality indicators or some other indicator(s) of channel quality.

The means may be further configured to perform: populating said lookup table with outputs of a Multiple Input Multiple Output (MIMO) algorithm, wherein the MIMO algorithm receives estimated channel metrics from a statistical model. The lookup table may be populated based on a statistical model of the relevant channel. The lookup table may be populated offline (e.g. in a non-critical part of the process, such that the table need not be updated within the relevant slot window).

Some example embodiments further comprise obtaining said statistical model, for example by downloading a statistical model (e.g. from a packet scheduler speedup (PSS) module of an oRAN controller). The statistical model may be a machine-learned model.

Some embodiments further comprise: providing channel metric data for use in updating said statistical model.

Some example embodiments further comprise: determining the one or more user devices eligible to send data for transmission in said slot.

The said means may comprise: at least one processor; and at least one memory including computer program code, the at least one memory and the computer program configured, with the at least one processor, to cause the performance of the apparatus.

In a second aspect, this specification provides an apparatus comprising means for performing: receiving channel metric data (e.g. channel quality indications (CQI) or some other channel condition data) from a network node of a communication system; building a statistical model (e.g. a machine-learned model) that predicts future channel metric data; and providing the model to the network node. The prediction of future channel metric data may be based on factors such as the time of day, holiday periods, existing measured parameters etc. The model may be specific to the network node (e.g. a separate model may be generated for other network nodes).

The statistical model may be provided to the network node periodically (e.g. once period day). Alternatively, the statistical model may be provide aperiodically, e.g. as required.

The said means may comprise: at least one processor; and at least one memory including computer program code, the at least one memory and the computer program configured, with the at least one processor, to cause the performance of the apparatus.

In a third aspect, this specification describes a method comprising: executing, in a first mode of operation, a Multiple Input Multiple Output operation for one or more user devices eligible to transmit data in a slot of a packet scheduler, to generate Multiple Input Multiple Output operation outputs; obtaining, in a second mode of operation, estimated Multiple Input Multiple Output operation outputs for said one or more user devices from a lookup table (e.g. an ML-predicted lookup table); and determining whether to operate in the first mode of operation or the second mode operation.

The method may comprise: determining whether a load level of a communication node is above or below a threshold, wherein the method operates in the first mode when the load level is below said threshold and operates in the second mode when the load level is above said threshold. The method may comprise determining the said load level.

The Multiple Input Multiple Output operation may be executed, in the first mode of operation, using channel metric data (e.g. channel quality indicators) as inputs to said operation.

The method may further comprise: populating said lookup table with outputs of a Multiple Input Multiple Output algorithm, wherein the Multiple Input Multiple Output algorithm receives estimated channel metrics from a statistical model (such as a machine-learned model). The lookup table may be populated offline. The method may further comprise: obtaining said statistical model (e.g. by downloading said model). The method may comprise: providing channel metric data for use in updating said statistical model.

The method may comprise: determining the one or more user devices eligible to send data for transmission in said slot.

In a fourth aspect, this specification describes a method comprising: receiving channel metric data (e g channel quality indications) from a network node of a communication system; building a statistical model (e.g. a machined-learned model) that predicts future channel metric data; and providing the model to the network node. The predictions may be based on factors such as time of day, holiday periods, existing measured parameters etc. The model may be specific to said network node (e.g. a separate model may be generated for other network nodes). The model may be provided to the network node periodically; alternatively, the model may be provided to the network node aperiodically (e.g. based on some event).

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: executing, in a first mode of operation, a Multiple Input Multiple Output operation for one or more user devices eligible to transmit data in a slot of a packet scheduler, to generate Multiple Input Multiple Output operation outputs; obtaining, in a second mode of operation, estimated Multiple Input Multiple Output operation outputs for said one or more user devices from a lookup table; and determining whether to operate in the first mode of operation or the second mode operation.

In an eighth aspect, this specification describes a computer program comprising instructions for causing an apparatus to perform at least the following: receiving channel metric data from a network node of a communication system; building a statistical model that predicts future channel metric data; and providing the model to the network node.

In a ninth aspect, this specification describes a computer-readable medium (such as a non-transitory computer-readable medium) comprising program instructions stored thereon for performing at least the following: executing, in a first mode of operation, a Multiple Input Multiple Output operation for one or more user devices eligible to transmit data in a slot of a packet scheduler, to generate Multiple Input Multiple Output operation outputs; obtaining, in a second mode of operation, estimated Multiple Input Multiple Output operation outputs for said one or more user devices from a lookup table; and determining whether to operate in the first mode of operation or the second mode operation.

In an tenth aspect, this specification describes a computer-readable medium (such as a non-transitory computer-readable medium) comprising program instructions stored thereon for performing at least the following: receiving channel metric data from a network node of a communication system; building a statistical model that predicts future channel metric data; and providing the model to the network node.

In an eleventh aspect, this specification describes an apparatus comprising: at least one processor; and at least one memory including computer program code which, when executed by the at least one processor, causes the apparatus to: execute, in a first mode of operation, a Multiple Input Multiple Output operation for one or more user devices eligible to transmit data in a slot of a packet scheduler, to generate Multiple Input Multiple Output operation outputs; obtain, in a second mode of operation, estimated Multiple Input Multiple Output operation outputs for said one or more user devices from a lookup table; and determine whether to operate in the first mode of operation or the second mode operation.

In a twelfth aspect, this specification describes an apparatus comprising: at least one processor; and at least one memory including computer program code which, when executed by the at least one processor, causes the apparatus to: receive channel metric data from a network node of a communication system; build a statistical model that predicts future channel metric data; and provide the model to the network node.

In a thirteenth aspect, this specification describes an apparatus (e.g. a packet scheduler module) comprising a first module (e.g. a MIMO processor) for executing, in a first mode of operation, a Multiple Input Multiple Output (MIMO) operation for one or more user devices eligible to transmit data in a slot of a packet scheduler, to generate Multiple Input Multiple Output operation outputs; a second module (e.g. a MIMO estimator) for obtaining, in a second mode of operation, estimated Multiple Input Multiple Output operation outputs for said one or more user devices from a lookup table (e.g. a ML predicted lookup table); and a third module (which may be implemented by the second module) for determining whether to operate in the first mode of operation or the second mode operation. The apparatus may be provided at a communication node, such as a base station, gNB etc. The MIMO operation may, for example, be a multi-user MIMO operation or a Massive MIMO operation.

In a fourteenth aspect, this specification describes an apparatus (e.g. a model builder module) comprising an input for receiving channel metric data (e.g. channel quality indications (CQI) or some other channel condition data) from a network node of a communication system; a processor for building a statistical model (e.g. a machine-learned model) that predicts future channel metric data; and an output for providing the model to the network node. The prediction of future channel metric data may be based on factors such as the time of day, holiday periods, existing measured parameters etc. The model may be specific to the network node (e.g. a separate model may be generated for other network nodes).

BRIEF DESCRIPTION OF THE DRAWINGS

Example embodiments will now be described, by way of non-limiting examples, with reference to the following schematic drawings, in which.

DETAILED DESCRIPTION

Figure 1:
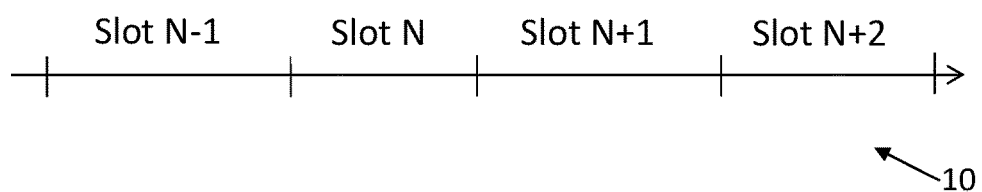
FIG. 1 is a block diagram showing a plurality of communication slots in accordance with an example embodiment.

The scope of protection sought for various example embodiments of the invention is set out by the independent claims. The example embodiments and features, if any, described in the specification that do not fall under the scope of the independent claims are to be interpreted as examples useful for understanding various example embodiments of the invention.

In the description and drawings, like reference numerals refer to like elements throughout.

FIG. 1 is a block diagram, indicated generally by the reference numeral 10, showing a plurality of communication slots in accordance with an example embodiment (specifically slots N−1, N, N+1 and N+2).

Each slot may, for example, be the output of a packet scheduler, such as a MAC packet scheduler (e.g. in accordance with 5G New Radio (NR) standards). The timing of the slots 10 may be predefined, such that a packet scheduler (for example a MAC packet scheduler) for generating data for transmission within the slots 10 may have strict time windows for scheduling data for transmission.

The data processing carried out for generating data for communication in the slots 10 can take many forms. In some embodiments, it can be difficult to complete the required processing within the slot duration. This may, for example, due to the need to support some or all of the following:

Bandwidth of the order of 100 MHz

Multiple-Input Multiple-Output (MIMO) algorithms, such as massive MIMO, Multi-User MIMO (MU-MIMO) etc.

mmW with very short slot duration (e.g. 125 μs)

Ultra-Reliable Low-Latency (URLLC) requirements

Demands to support hundreds of users per base station

The need to reduce costs.

Figure 2:
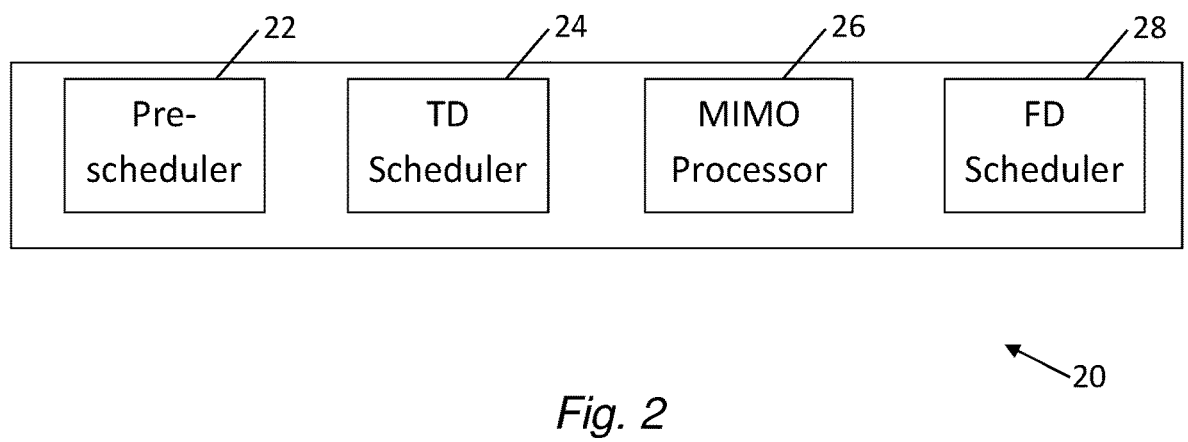
FIGS. 2 and 3 are block diagrams of systems in accordance with example embodiments.

FIG. 2 is a block diagram of a system, indicated generally by the reference numeral 20, in accordance with an example embodiment. The system 20 is an example of a packet scheduler that may generate data for communication in the data slots 10 described above.

The system 20 comprises a pre-scheduler 22, a time domain (TD) scheduler 24, a MIMO processor 26 and a frequency domain (FD) processor 28.

The pre-scheduler 22 prepares a first candidate set list (CS-1). The CS-1 list is a list of user devices (UEs) that have data to send and that are eligible for scheduling in the upcoming transmit time intervals (TTIs). Thus, at least some of the eligible UEs may transmit data within one or more of the slots 10 described above.

The time domain (TD) scheduler 24 and the MIMO processor 26 process the CS-1 list to generate a subset of that list that forms a second candidate list (CS-2). The processing by the time domain scheduler 24 may include factors such as UE priority, urgency, quality of service metrics and throughput. The processing by the MIMO processor 26 includes, for example, performing functions such as beam metric calculation, finding centroid beams, creating sub-cells, performing time domain allocation etc. The MIMO processor 26 may implement one of many different MIMO algorithms, such as a multi-user MIMO (MU-MIMO) algorithm (and its many variants, including 'Voronoi algorithm with complex centroid beam selection').

The frequency domain (FD) processor 28 allocates physical resource blocks to UEs within the CS-2 list, such that data can be communicated within a transmission slot.

As indicated above, it can be difficult for packet schedulers, such as the system 20, to process data in time for transmission in upcoming transmit time intervals (TTIs), such as one of the slots 10. For example, MIMO processing can be time consuming such that it can be difficult for the MIMO processor 26 to complete the desired processing within an allowed time period or slot duration (such as 125 μs for millimetre wave transmissions and 500 μs for centimetre wave transmissions).

Many advanced MIMO algorithms have been developed. Many of these algorithms provide excellent performance (e.g. high spectral efficiency), but are computationally intensive (and therefore take time to process data). The CPU cycles requirements of at least some of these algorithms make it difficult to execute these algorithms in a time-critical path of a packet scheduler without over-shooting the timing budget for the relevant slot.

Figure 3:
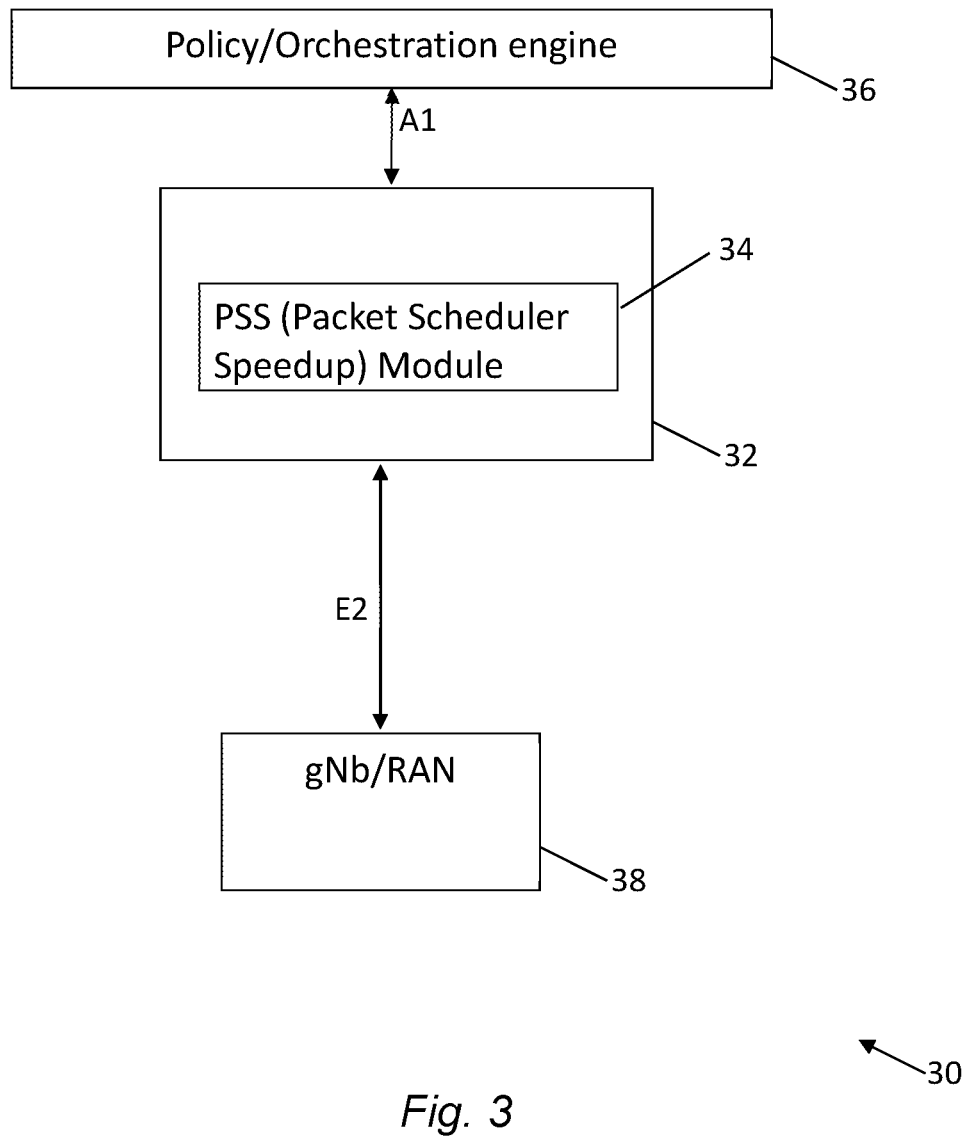

FIG. 3 is a block diagram of a system, indicated generally by the reference numeral 30, in accordance with an example embodiment.

The system 30 comprises a radio controller 32 having a packet scheduler speedup (PSS) module 34. The radio controller 32 is in two-way communication with a policy/orchestration engine 36 and is also in two-way communication with a communication node 38, such as a base station (e.g. gNB/RAN).

The PSS module 34 receives (via a policy application program interface (API)) policies from the policy/orchestration engine 36 such as: indications of cells on which the packet scheduler speedup (PSS) module 34 is to be applied; and operator defined criteria(s) on when to enable/disable the PSS module 34 (e.g. based on service level agreements and/or RAN conditions or characteristics). The PSS module 34 also receives (via another API) a range of data from the communication node 38.

On the basis of the data received form the communication node 38, the PSS module 34 builds a model (e.g. a "UE channel time series") that may be used in packet scheduling. In particular, as discussed in detail below, the model enables per UE input parameters that can be used to execute MIMO algorithms to be estimated. These estimates enable potential MIMO algorithm outputs to be generated in advance (outside the critical time path). The appropriate MIMO algorithm outputs can be fetched during a time-critical packet scheduling operation, without the need for computationally intensive and time-consuming MIMO processing to be carried out at that time.

Examples of data that might be provided from the communication node 38 to the PSS module 34 are set out below (of course, these data are provided by way of example, other data could provide in addition to, or instead of, some of the these data):

UE channel quality indications

CPU cycles consumption by packet scheduler

Key Performance Indicators (KPIs) (e.g. a number of connected users, a number of active users, a number of bearers, downlink or uplink PRB utilization, PDCCH utilization, PUCCH utilization, composite available capacity, total data delivered or received at the node etc.)

Performance metrics for the model generated by the PSS module 34.

Figure 4:
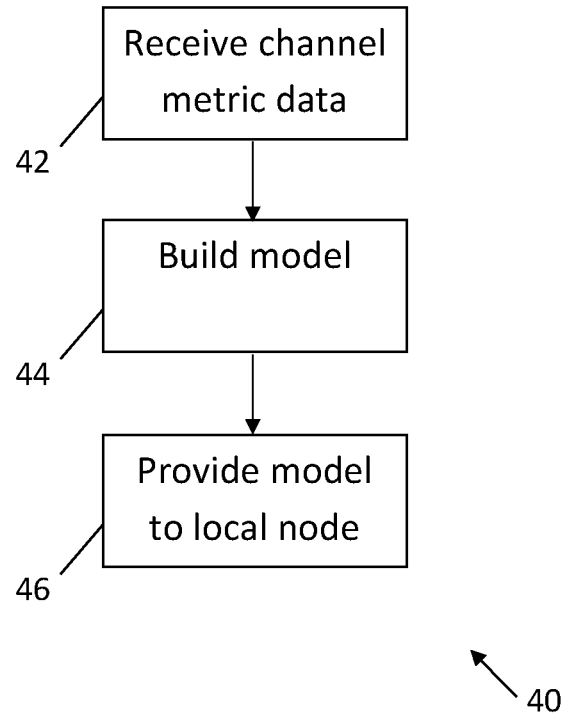
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 42, where channel metric data (e.g. channel quality indications (CQI) or some other channel condition data) are received (e.g. at PSS scheduler 34) from a network node (e.g. from the communication node 38) of a communication system.

At operation 44, a statistical model is built (e.g. at the PSS module 34) that can be used to predict future channel metric data (e.g. per UE channel metric data/channel parameters).

The predictions may, for example, be based on factors such as the time of day, holiday periods, existing/current measured parameters etc. The model generated in an instance of the operation 44 may be specific to a particular network node (e.g. different models may be generated for other network nodes).

In one example embodiment, the model is created (in operation 44) by collecting (in operation 42) per TTI or slot channel conditions (e.g. CQI for each UE). The following UE attributes can be used (by way of example):

Averaged rate of change of CQI to account for shadow fading

Level crossing rate (LCR) of the CQI of user to account for fast fading.

At operation 46, the model generated in operation 44 is provided to the network node (e.g. the communication node 38). The model may be downloaded (e.g. by the node 38) over an E2 standard interface. The model may be downloaded periodically, but this is not essential to all embodiments. For example, the model may be downloaded in the event of certain triggers (e.g. performance triggers). In one example embodiment, the model is downloaded once per day (e.g. overnight, when traffic volumes are typically low). Moreover, the times at which the model is downloaded may be a variable that could, for example, be fine-tuned over time based on performance.

Figure 5:
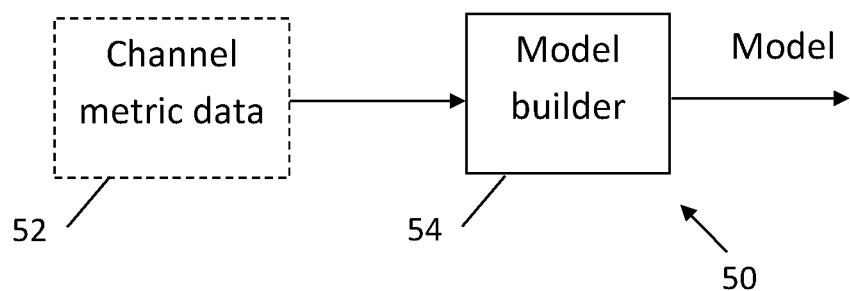
FIG. 5 is a block diagram of a system in accordance with an example embodiment.

FIG. 5 is a block diagram of a system, indicated generally by the reference numeral 50, in accordance with an example embodiment. The system 50 comprises a model builder (that may form part of the PSS module 34 described above). The model builder 54 receives channel metric data (e g channel quality indication (CQI) or some other channel condition data), builds a statistical model that predicts future channel metric data (e.g. for the next few time slots), and provides the model to a network node. The statistical model may be a machine-learned model.

The system 50 includes a module 52 for providing channel metric data (e.g. per UE channel quality indicators) for use in updating said statistical model by the model builder 54. For example, the metric data may be provided to a PSS module, such as the module 34 described above.

Figure 6:
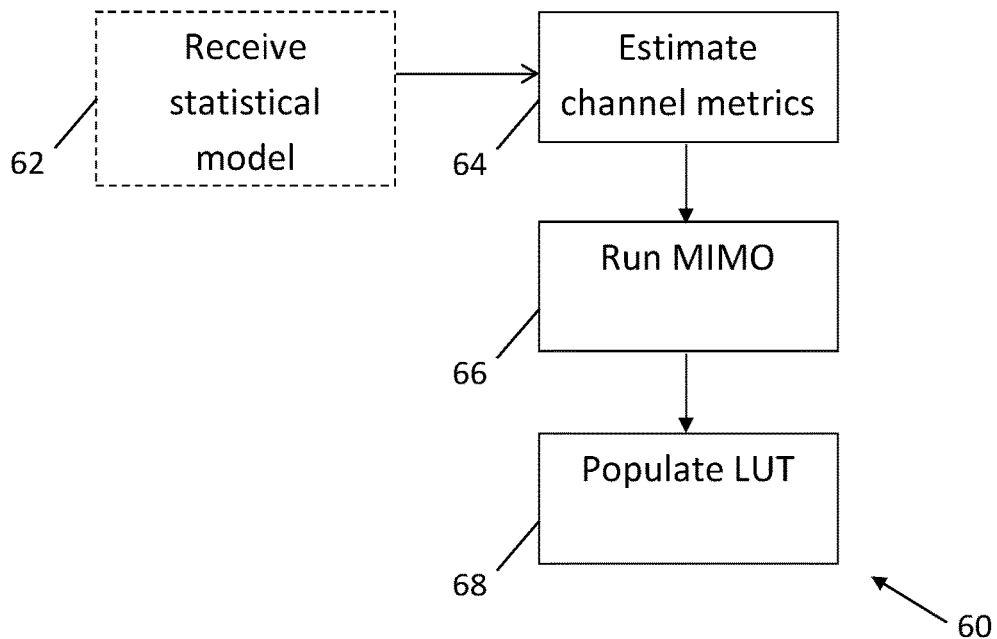
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 may be executed at one of a number of communication nodes (e.g. a base station or gNB), such as the node 38 described above.

At operation 62, a statistical model is received. The model may be developed by the PSS module 34 or the model builder 54 described above. The model may, for example, be downloaded to a gNB over an E2 standard interface. As described above, the operation 62 may be performed periodically (e.g. once per day) or in response to a trigger, such that the operation 62 may not be executed each time the algorithm 60 is executed. (Hence that operation is shown in dotted form in the algorithm 60.)

At operation 64, the statistical model is used to estimate channel metrics for the relevant channels. For example, channel estimates such as channel quality indications (CQIs) or some other indicator(s) of channel may be estimated for the next few time slots.

At operation 66, a MIMO algorithm is executed using the estimated channel metrics as inputs to the algorithm. The operation 66 may be implemented outside the time critical path of the packet scheduler (e.g. the packet scheduler 20 described above) and may, for example, be executed on a different processor core.

At operation 68, a lookup table (LUT) is populated based on the outputs of the MIMO algorithm (i.e. based on the outputs generated in the operation 66). The lookup table populated in the operation 68 matches MIMO slot numbers for the relevant nodes to MIMO algorithm outputs (based on the channel metric data estimated in the operation 64). Thus, the real MIMO algorithm can be used, based on channel metric data estimated using the statistical model obtained in the operation 62.

In this way, the lookup table can be populated offline, e.g. in a non-critical part of the process. Thus, the lookup table does not need to be updated within one of the slot windows described above.

Figure 7:
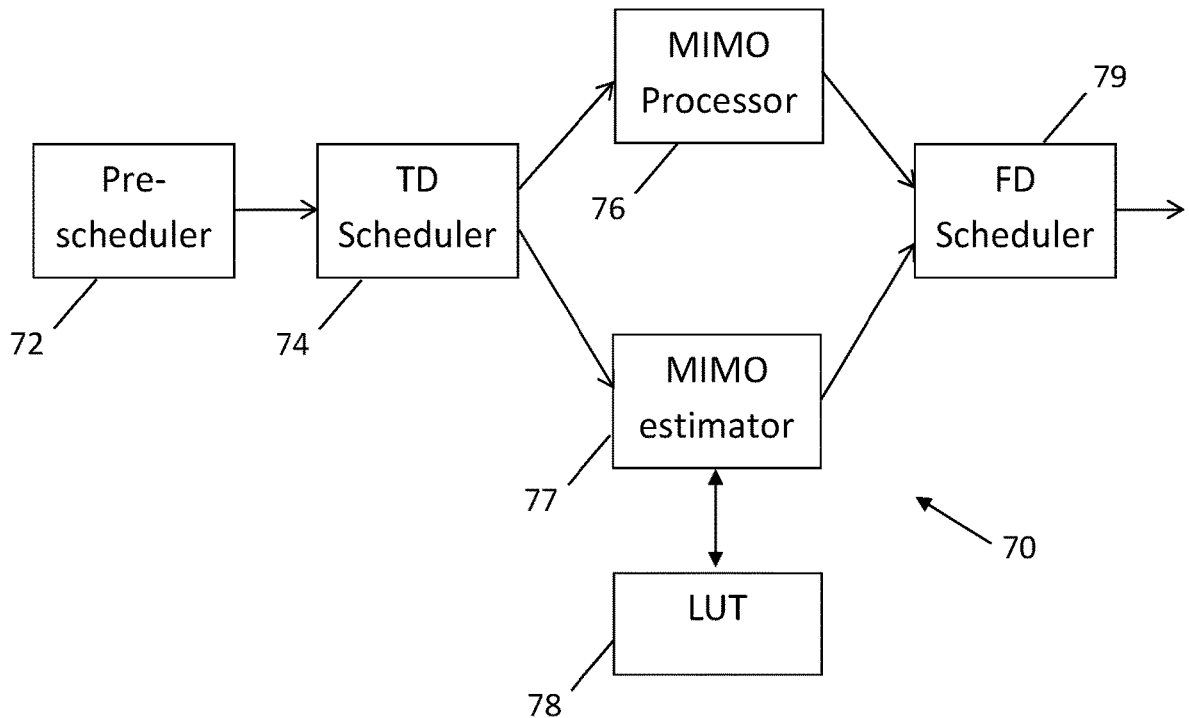
FIG. 7 is a block diagram of a system in accordance with an example embodiment.

FIG. 7 is a block diagram of a system, indicated generally by the reference numeral 70, in accordance with an example embodiment.

The system 70 comprises a pre-scheduler 72 (similar to the pre-scheduler 22 described above), a time domain (TD) scheduler 74 (similar to the time domain (TD) scheduler 24 described above), a MIMO processor 76 (similar to the MIMO processor 26 described above) and a frequency domain (FD) processor 79 (similar to the frequency domain (FD) processor 28 described above). The system 70 further comprises a MIMO estimator 77 and a lookup table (LUT) 78.

Figure 8:
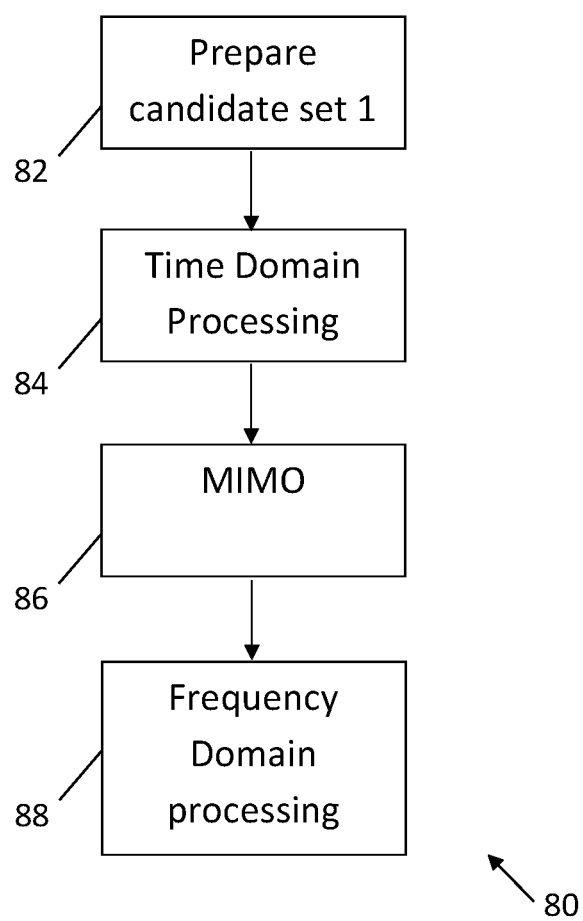
FIGS. 8 to 10 are flow charts showing algorithms in accordance with example embodiments.

FIG. 8 is a flow chart showing an algorithm, indicated generally by the reference numeral 80, in accordance with an example embodiment. The algorithm 80 may be implemented using the system 70.

The algorithm 80 starts at operation 82, where the pre-scheduler 72 prepares a first candidate set list (CS-1) of user devices (UEs) that have data to send and that are eligible for scheduling in the upcoming transmit time intervals (TTIs) (e.g. slots).

At operation 84, the time domain (TD) scheduler 74 processes the CS-1 list. The processing in the operation 84 may include factors such as UE priority, urgency, quality of service metrics and throughput.

At operation 86, MIMO processing is carried out to generate MIMO algorithm output values. The operation 86 may be implemented by the MIMO processor 76 or the MIMO estimator 77, as discussed in detail below. Thus, the operations 84 and 86 process the CS-1 list to generate a subset of that list that form a second candidate list (CS-2) At operation 88, the frequency domain (FD) processor 79 allocates physical resource blocks to UEs within the CS-2 list, such that data can be communicated with a transmission slot. The processing is performed by the FD processor 79 based on the MIMO algorithm output values generated in the operation 86 and other aspects or considerations.

As indicated above, it can be difficult for packet schedulers, such as the system 20, to process data in time for transmission in upcoming transmit time intervals (TTIs) or slots. For example, MIMO processing can be time consuming such that it can be difficult for the MIMO processor 26 to complete the desired processing within an allowed time period (or slot duration).

Figure 9:
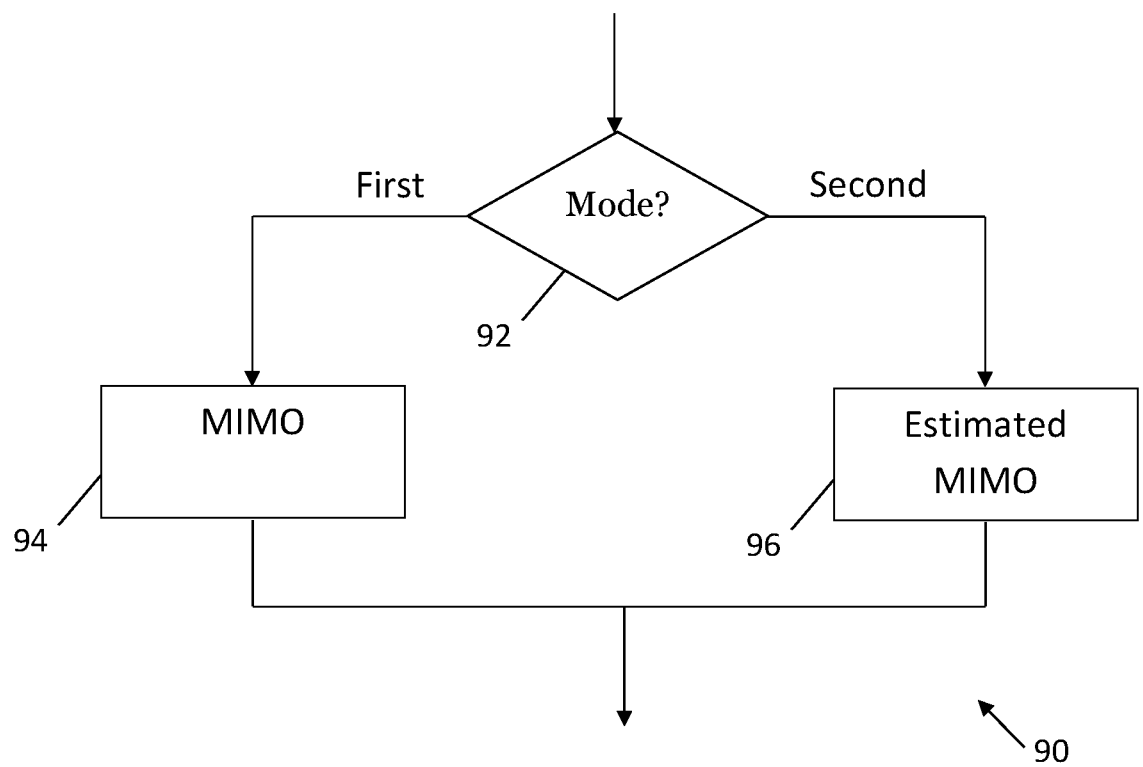

FIG. 9 is a flow chart showing an algorithm, indicated generally by the reference numeral 90, in accordance with an example embodiment. The algorithm 90 is an example implementation of operation 86 of the algorithm 80 described above.

The algorithm 90 starts at operation 92, where a mode of operation is determined. The algorithm 90 has two modes of operation. The first mode of operation may correspond to a lightly-loaded scenario, in which the algorithm moves to operation 94. The second mode of operation may correspond to a heavily-loaded scenario in which the algorithm moves to operation 96.

In operation 94 (i.e. in the first mode of operation), a Multiple Input Multiple Output operation is implemented (e.g. by the MIMO processor 76) to generate Multiple Input Multiple Output operation outputs for one or more user devices eligible to transmit data in a slot of a packet scheduler. In operation 96 (i.e. in the second mode of operation), estimated Multiple Input Multiple Output operation outputs are obtained (e.g. by the MIMO estimator 77) for the one or more user devices eligible to transmit data in a slot of a packet scheduler. The estimated MIMO operation outputs are obtained from the lookup table 78. The operation 88 of the algorithm 80 can then be implemented based on either the MIMO operations generated in the operation 94 or the estimated MIMO operations outputs generated in the operation 96.

Thus, in a first mode of operation (such as a lightly loaded scenario), a MIMO algorithm may be executed in the time-critical path of a packet scheduler. Thus, operation in the first mode may be implemented only when it deemed possible to execute the time-critical part of the packet scheduler processing (including the MIMO operation) without over-shooting the timing budget of the relevant packet slot.

Figure 10:
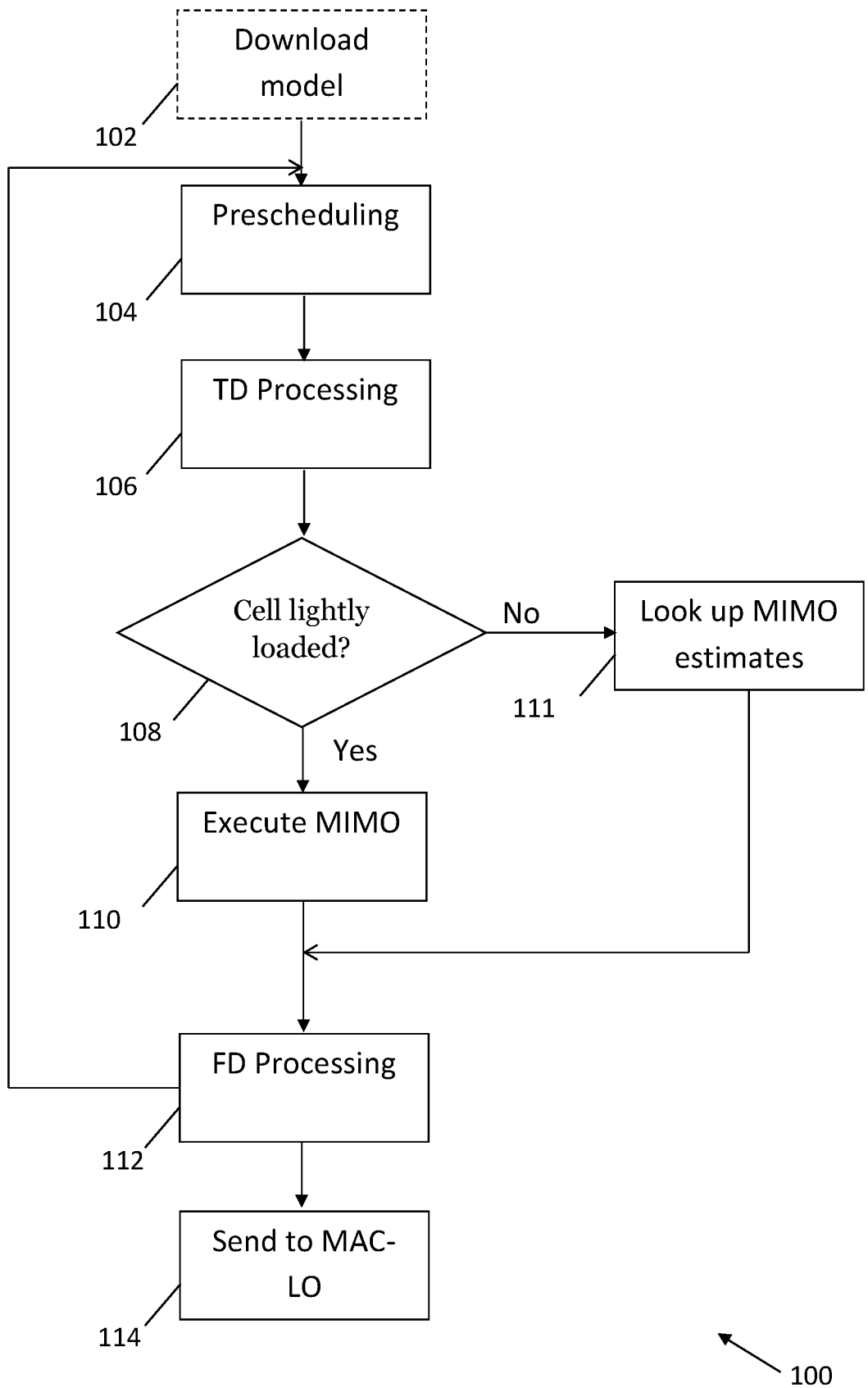

FIG. 10 is a flow chart showing an algorithm, indicated generally by the reference numeral 100, in accordance with an example embodiment. The algorithm 100 may, for example, be implemented at a packet scheduler at a base station, such as a gNB.

The algorithm 100 starts at operation 102, where a model (e.g. the statistical model described in detail above) is downloaded. The model may not be downloaded on each instance of the algorithm 100, hence the operation 102 is shown in dotted format in FIG. 10. The model may be a machined-learned model.

At operation 104, a pre-scheduling operation is performed. For example, the pre-scheduler 72 of the system 70 may be used to prepare a first candidate set list (CS-1) of user devices (UEs) that have data to send and that are eligible for scheduling in the upcoming transmit time intervals (TTIs). The operation 104 may, for example, determine one or more user devices eligible to send data for transmission for a particular slot.

At operation 106, time domain (TD) processing is performed. The TD processing is performed on the CS-1 list and may include factors such as UE priority, urgency, quality of service metrics and throughput.

At operation 108, a determination is made regarding whether the relevant communication cell is lightly loaded. Thus, the operation 108 determines whether to operate in a first mode of operation (lightly loaded) or a second mode operation (heavily loaded). If the cell is deemed to be lightly loaded, then the algorithm 100 moves to operation 110; otherwise, the algorithm 100 moves to operation 111.

The operation 108 may be implemented by determining whether a load level of the relevant communication node is above or below a threshold, wherein the apparatus is determined to operate in the first mode when the load level is below said threshold and the apparatus is determined to operate in the second mode when the load level is above said threshold.

At operation 110 (e.g. the first mode of operation), a MIMO operation is executed for one or more user devices eligible to transmit data in a slot of a packet scheduler, to generate Multiple Input Multiple Output operation outputs. The MIMO operation may be executed using channel metric data as inputs to said operation. The channel metric data may comprise channel quality indicators or some other indicator(s) of channel quality. Such quality indicators are the primary inputs to many MIMO algorithms (such that the channel quality indicators are used, by the MIMO algorithm, to determine MIMO algorithm output). When the operation 110 is complete, the algorithm 100 moves to operation 112.

At operation 111 (e.g. the second mode of operation), estimated Multiple Input Multiple Output operation outputs are obtained from a lookup table (such as the LUT 78). When the operation 111 is complete, the algorithm 100 moves to operation 112.

At operation 112, frequency domain (FD) processing is carried out. For example, the FD processor 79 may be used to allocate physical resource blocks to UEs within the CS-2 list (the subset of the CS-1 list that is the output of the TD processing and the MIMO processing, as discussed above), such that data can be communicated with a transmission slot.

With the frequency domain processing complete, the relevant packet data are sent for transmission (in operation 114). At the same time, the algorithm returns to operation 104 to start scheduler processing for the next slot.

Figure 11:
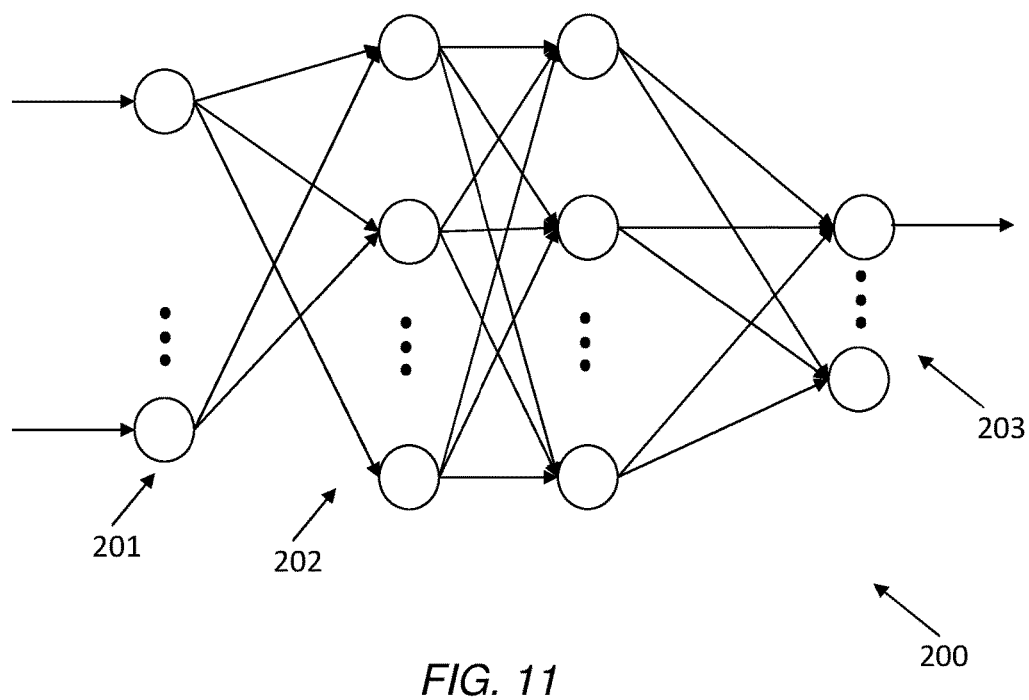
FIG. 11 shows a neural network in accordance with an example embodiment.

The models discussed above (such as the statistical model built in the operation 44) that predicts future channel metric data may be machine-learned models. FIG. 11 shows a neural network, indicated generally by the reference numeral 200, that may be used to implement such a machine-learned model in accordance with an example embodiment. The neural network 200 comprises an input layer 201, a hidden layer 202 (or a plurality of hidden layers 202), and an output layer 203. At the input layer 201, one or more inputs are received (such as channel quality indicators). The hidden layers 202 may comprise a plurality of hidden nodes, where the processing may be performed based on the received inputs. At the output layer 203, one or more outputs (e.g. estimated MIMO outputs) are determined. Of course, the model 200 is provided by way of example only. Many variants will be readily apparent to those skilled in the art.

Figure 12:
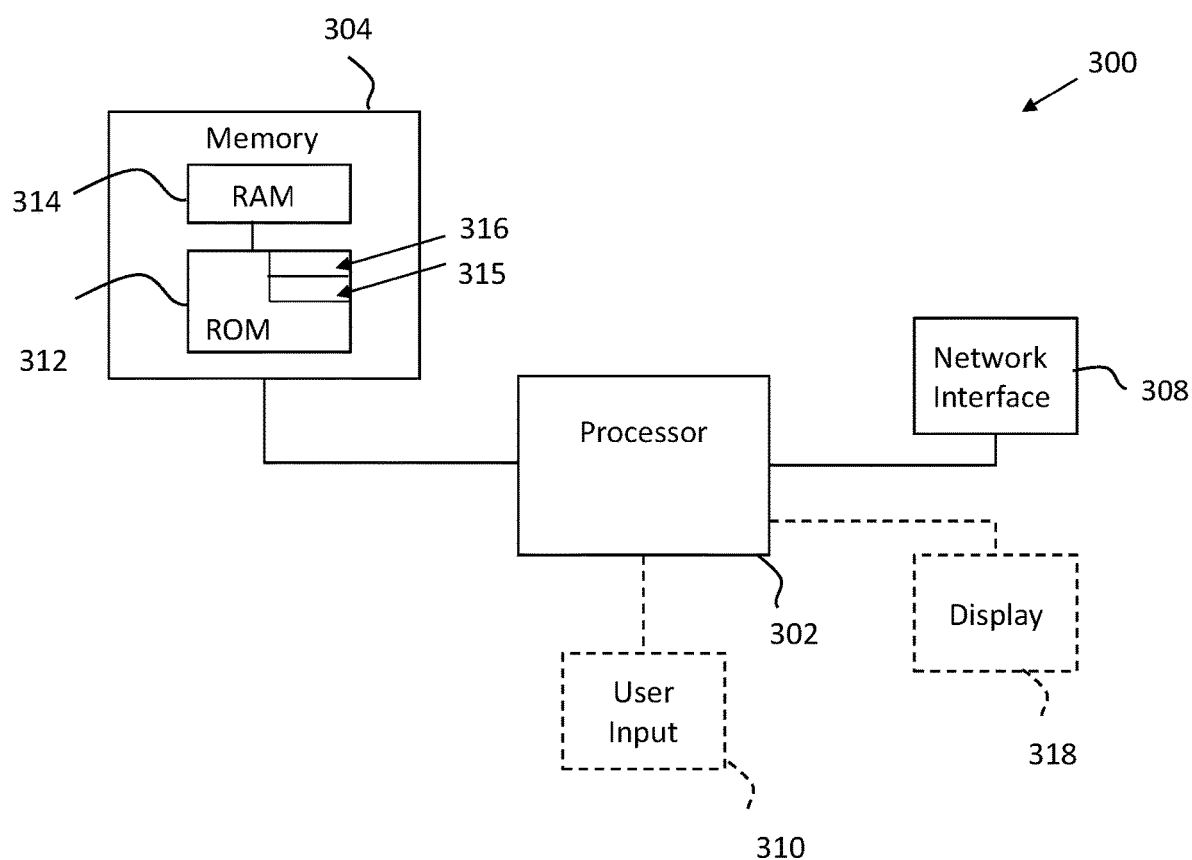
FIG. 12 is a block diagram of components of a system in accordance with an example embodiment.

For completeness, FIG. 12 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 60, 80, 90 and 100 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 13A:
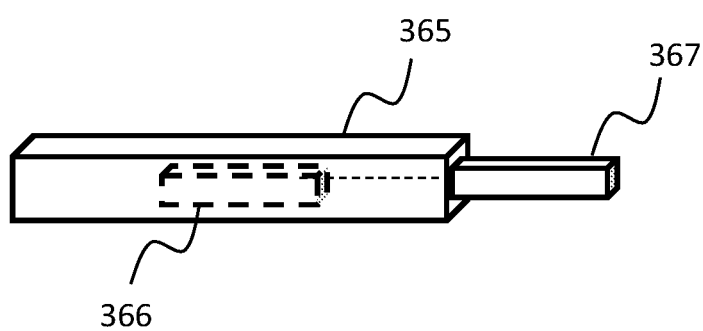
FIGS. 13A and 13B show tangible media, respectively a removable non-volatile memory unit and a Compact Disc (CD) storing computer-readable code which when run by a computer perform operations according to example embodiments.
Figure 13B:
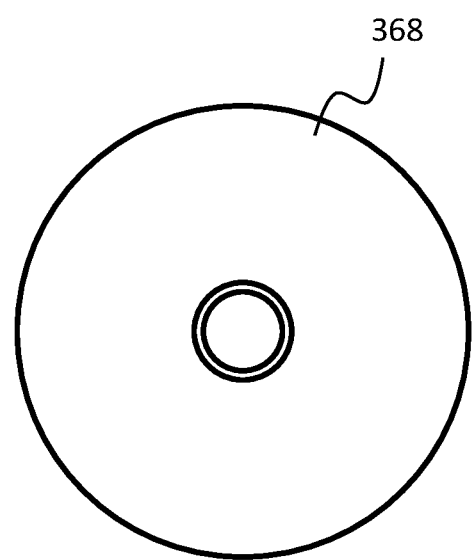

FIGS. 13A and 13B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined.

Similarly, it will also be appreciated that the flow diagrams and message sequences of FIGS. 4, 6, 8, 9 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising: a hardware packet scheduler configured to: determine whether a load level of a communication node is above or below a threshold; determine whether to operate in a first mode of operation or a second mode of operation, wherein the apparatus is determined to operate in the first mode when the load level is below said threshold and the apparatus is determined to operate in the second mode when the load level is above said threshold; generate Multi-user Multiple Input Multiple Output operation outputs for one or more user devices eligible to transmit data in a slot of a packet scheduler when it is determined to operate in the first mode; obtain estimated Multi-user Multiple Input Multiple Output operation outputs for one or more user devices from a lookup table when it is determined to operate in the second mode; and execute a Multi-user Multiple Input Multiple Output operation outputs for the one or more user devices eligible to transmit data in the slot of the packet scheduler using the generated Multi-user Multiple Input Multiple Output operation outputs in the first mode and using the obtained estimated Multi-user Multiple Input Multiple Output operation outputs in the second mode.

2. An apparatus as claimed in claim 1, wherein the Multi-user Multiple Input Multiple Output operation is executed, in the first mode of operation, using channel metric data as inputs to said operation.

3. An apparatus as claimed in claim 2, wherein said channel metric data comprise channel quality indicators.

4. An apparatus as claimed in claim 1, wherein the packet scheduler is further configured to perform: populating said lookup table with outputs of a Multi-user Multiple Input Multiple Output algorithm, wherein the Multi-user Multiple Input Multiple Output algorithm receives estimated channel metrics from a statistical model.

5. An apparatus as claimed in claim 4, wherein said lookup table is populated offline.

6. An apparatus as claimed in claim 4, wherein the packet scheduler is further configured to perform: obtaining said statistical model.

7. An apparatus as claimed in any claim 4, wherein said statistical model is a machine-learned model.

8. An apparatus as claimed in claim 4, wherein the packet scheduler is further configured to perform: providing channel metric data for use in updating said statistical model.

9. An apparatus as claimed in claim 1, wherein said Multi-user Multiple Input Multiple Output operation is a Massive Multiple Input Multiple Output operation.

10. An apparatus as claimed in claim 1, wherein the packet scheduler is further configured to perform: determining the one or more user devices eligible to send data for transmission in said slot.

11. An apparatus as claimed in claim 1, wherein the packet scheduler comprises: at least one processor; and at least one memory including computer program code, the at least one memory and the computer program configured, with the at least one processor, to cause the performance of the apparatus.

12. A method comprising: determining whether a load level of a communication node is above or below a threshold; determining whether to operate in a first mode of operation or a second mode of operation, wherein the apparatus is determined to operate in the first mode when the load level is below said threshold and the apparatus is determined to operate in the second mode when the load level is above said threshold; generating Multi-user Multiple Input Multiple Output operation outputs for one or more user devices eligible to transmit data in a slot of a packet scheduler using a Multiple Input Multiple Output algorithm when it is determined to operate in the first mode; obtaining estimated Multi-user Multiple Input Multiple Output operation outputs for one or more user devices from a lookup table when it is determined to operate in the second mode; and executing a Multi-user Multiple Input Multiple Output operation outputs for the one or more user devices eligible to transmit data in the slot of the packet scheduler using the generated Multi-user Multiple Input Multiple Output operation outputs in the first mode and using the obtained estimated Multi-user Multiple Input Multiple Output operation outputs in the second mode.

13. A method as claimed in claim 12, further comprising determining said load level.

14. A non-transitory computer-readable medium comprising computer program instructions stored thereon for perform at least the following: determining whether a load level of a communication node is above or below a threshold; determining whether to operate in a first mode of operation or a second mode of operation, wherein the apparatus is determined to operate in the first mode when the load level is below said threshold and the apparatus is determined to operate in the second mode when the load level is above said threshold; generating Multi-user Multiple Input Multiple Output operation outputs for one or more user devices eligible to transmit data in a slot of a packet scheduler using a Multiple Input Multiple Output algorithm when it is determined to operate in the first mode; obtaining estimated Multi-user Multiple Input Multiple Output operation outputs for one or more user devices from a lookup table when it is determined to operate in the second mode; and executing a Multi-user Multiple Input Multiple Output operation outputs for the one or more user devices eligible to transmit data in the slot of the packet scheduler using the generated Multi-user Multiple Input Multiple Output operation outputs in the first mode and using the obtained estimated Multi-user Multiple Input Multiple Output operation outputs in the second mode.

15. An apparatus comprising: a Multiple Input Multiple Output processor configured to: determine whether a load level of a communication node is above or below a threshold; and generate Multi-user Multiple Input Multiple Output operation outputs for one or more user devices eligible to transmit data in a slot of a packet scheduler using a Multiple Input Multiple Output algorithm when it is determined to operate in the first mode; and execute a Multi-user Multiple Input Multiple Output operation outputs for the one or more user devices eligible to transmit data in the slot of the packet scheduler using the generated Multi-user Multiple Input Multiple Output operation outputs in a first mode and using an obtained estimated Multi-user Multiple Input Multiple Output operation outputs in a second mode a Multiple Input Multiple Output estimator configured to: determine whether to operate in the first mode of operation or the second mode of operation, wherein the apparatus is determined to operate in the first mode when the load level is below said threshold and the apparatus is determined to operate in the second mode when the load level is above said threshold; and obtain estimated Multi-user Multiple Input Multiple Output operation outputs for one or more user devices from a lookup table when it is determined to operate in the second mode.

* * * * *